Patented Oct. 29, 1946

2,410,168

UNITED STATES PATENT OFFICE 2,410,168

HAND CLEANER

Werner E. Kleinicke, Manhasset, N. Y., assignor to The Johnson-March Corporation, New York, N. Y., a corporation of Delaware No Drawing. Application November 16, 1944, Serial No. 563,799

4 Claims. (Cl. 252—173)

This invention relates to a preparation more especially adaptable for use as a hand cleaner for the removal of grime, grease, or other soil from the hands, and especially from the crevices and pores of the hands.

The preparation according to this invention is adaptable for use by application without wash water, requiring merely application, manipulation and removal with a towel or rag. The preparation will not injure or roughen the skin and on removal from the hands will leave them soft and clean.

The preparation, in the form of a creamy, viscous liquid or light paste, which may be packaged in bottles, tubes, jars, or the like, depending upon particular consistency, will be highly efficient for use by mechanics and motorists.

The preparation will afford special convenience to motorists, who can carry it conveniently in their cars for use in cleaning the hands after changing a tire or making minor repairs on the road.

The preparation according to this invention will comprise an aqueous emulsion of stearic acid and an oil in a solution of soaps, the emulsion being stabilized by the presence in solution in the aqueous phase of an ethylene glycol, or glycerine.

More specifically the soaps will comprise an ethylene glycol stearate, as, for example, ethylene glycol stearate, diethylene glycol stearate, or the like, and an ethylene glycol laurate, as, for example, ethylene glycol laurate, diethylene glycol laurate, or the like.

The oil will desirably comprise white mineral oil U. S. P. However, equivalently, olive oil, coconut oil, or the like, may be used.

As illustrative of a typical preparation according to this invention a highly efficient cleaner may be made up on the following formula:

|  | Pounds |
|---|---|
| Diethyleneglycol stearate | 7.0 |
| Diethyleneglycol laurate | 7.0 |
| Stearic acid | 6.0 |
| White mineral oil U. S. P. | 1.0 |
| Diethylene glycol | 5.0 |
| Water (to desired consistency) | 70-350 |

Compositions on the above formula may be conveniently made up by melting the soaps, stearic acid and mineral oil together at a temperature of about 160° F. and then mixing with a solution of the ethylene glycol in the water previously heated to about 160° F.

In the completed preparation the soaps will effect emulsification of the stearic acid and the mineral oil in the water, while the ethylene glycol will act to stabilize the emulsion.

In use of the preparation the mineral oil will act to soften grease and grime on and in the crevices in the hands, and cause the soaps to penetrate into the crevices and pores of the hands for the removal of grease and grime. The ethylene glycol will act, as will also the oil, to soften the skin so that when the preparation is removed from the hands the skin will not only be clean but softened.

It will be understood that where in the claims appended hereto reference is made to white mineral oil, vegetable oils, as olive oil, coconut oil, and the like, are contemplated as equivalents. Again, where an ethylene glycol is called for glycerine is contemplated as an equivalent.

What I claim and desire to protect by Letters Patent is:

1. A hand cleaner comprising an emulsion of white mineral oil and stearic acid in an aqueous solution containing diethylene glycol stearate, diethylene glycol laurate and diethylene glycol.

2. A hand cleaner comprising an emulsion of white mineral oil and stearic acid in an aqueous solution containing diethylene glycol stearate, diethylene glycol laurate, the said soaps being in about equal amount, and diethylene glycol.

3. A hand cleaner comprising an emulsion of white mineral oil and stearic acid in an aqueous solution containing an ethylene glycol stearate, and an ethylene glycol laurate and an ethylene glycol.

4. A hand cleaner comprising an emulsion made up on the following formula:

|  | Pounds |
|---|---|
| Diethyleneglycol stearate | 7.0 |
| Diethyleneglycol laurate | 7.0 |
| Stearic acid | 6.0 |
| White mineral oil U. S. P. | 1.0 |
| Diethylene glycol | 5.0 |
| Water | 70-350 |

WERNER E. KLEINICKE.